(12) United States Patent
Saitoh

(10) Patent No.: US 10,663,824 B2
(45) Date of Patent: May 26, 2020

(54) LIQUID CRYSTAL DISPLAY PANEL AND METHOD FOR PRODUCING LIQUID CRYSTAL DISPLAY PANEL

(71) Applicant: SHARP KABUSHIKI KAISHA, Sakai, Osaka (JP)

(72) Inventor: Hajime Saitoh, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/500,085

(22) PCT Filed: Mar. 27, 2018

(86) PCT No.: PCT/JP2018/012256
§ 371 (c)(1),
(2) Date: Oct. 1, 2019

(87) PCT Pub. No.: WO2018/186228
PCT Pub. Date: Oct. 11, 2018

(65) Prior Publication Data
US 2020/0110296 A1    Apr. 9, 2020

(30) Foreign Application Priority Data
Apr. 3, 2017  (JP) .................... 2017-073910

(51) Int. Cl.
G02F 1/1333    (2006.01)
G02F 1/1368    (2006.01)
G02F 1/1362    (2006.01)

(52) U.S. Cl.
CPC ...... *G02F 1/1368* (2013.01); *G02F 1/133305* (2013.01); *G02F 1/136209* (2013.01); *G02F 2201/123* (2013.01)

(58) Field of Classification Search
CPC ................................. G02F 1/133305
See application file for complete search history.

(56) References Cited

U.S. PATENT DOCUMENTS

2011/0199564 A1*  8/2011  Moriwaki ........... H01L 51/5012
                                                  349/122
2014/0092354 A1   4/2014  Moriwaki
2015/0340418 A1  11/2015  Moriwaki
2016/0299376 A1  10/2016  Ishikawa et al.

FOREIGN PATENT DOCUMENTS

JP  2010-156723 A   7/2010
JP  2016-200698 A  12/2016
WO  2010/038514 A1  4/2010

\* cited by examiner

*Primary Examiner* — Edmond C Lau
(74) *Attorney, Agent, or Firm* — ScienBiziP, P.C.

(57) ABSTRACT

The present invention provides a liquid crystal display panel capable of reducing display defects due to bubbles. The liquid crystal display panel of the present invention includes, sequentially from a back side to a viewing side, a first substrate, a liquid crystal layer, and a second substrate. The first substrate includes, sequentially from a liquid crystal layer side, a pixel electrode and an organic insulating film in contact with the pixel electrode. The organic insulating film is provided with a void at a position overlapping an end of the pixel electrode. Preferably, the second substrate includes a black matrix and the void overlaps the black matrix.

14 Claims, 12 Drawing Sheets

Fig. 3-1
(a)
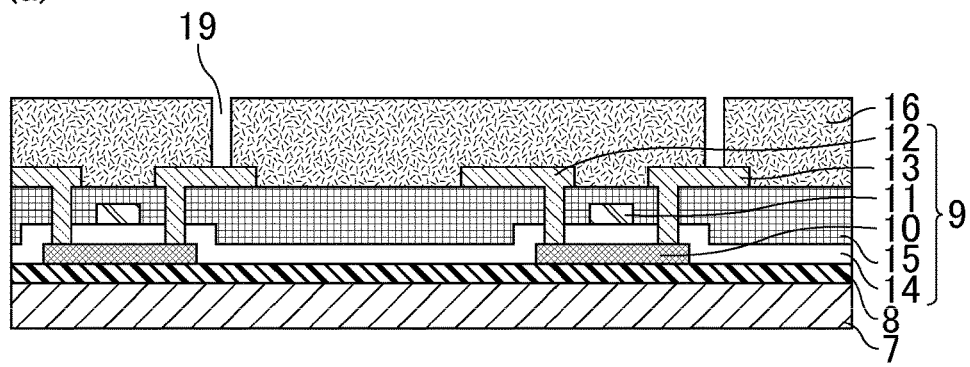
(b)
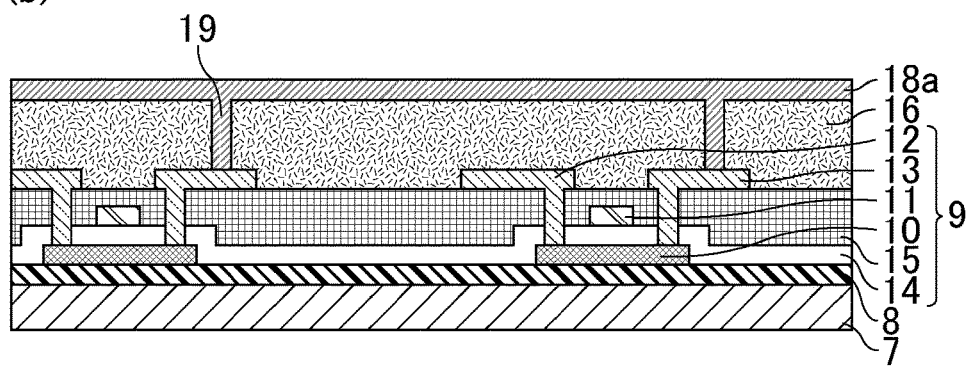
(c)
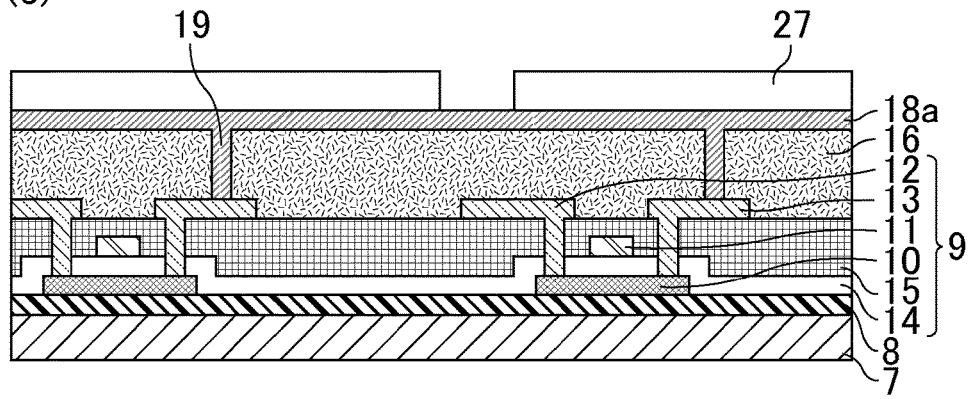
(d)
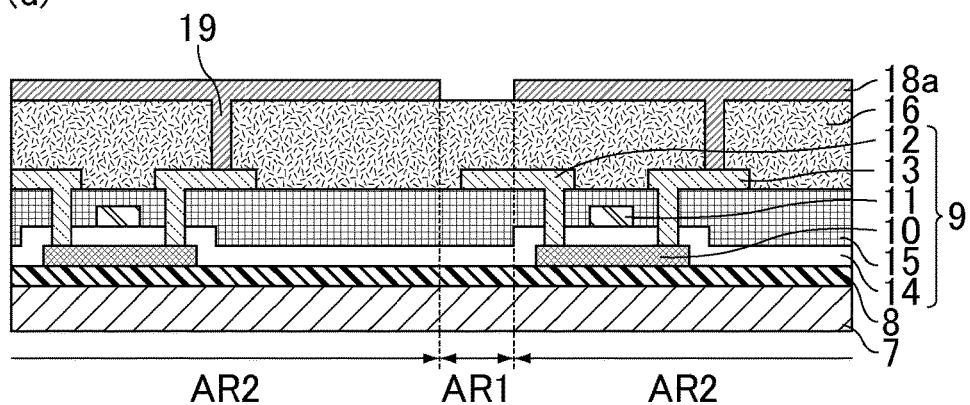

Fig. 3-2
(e)
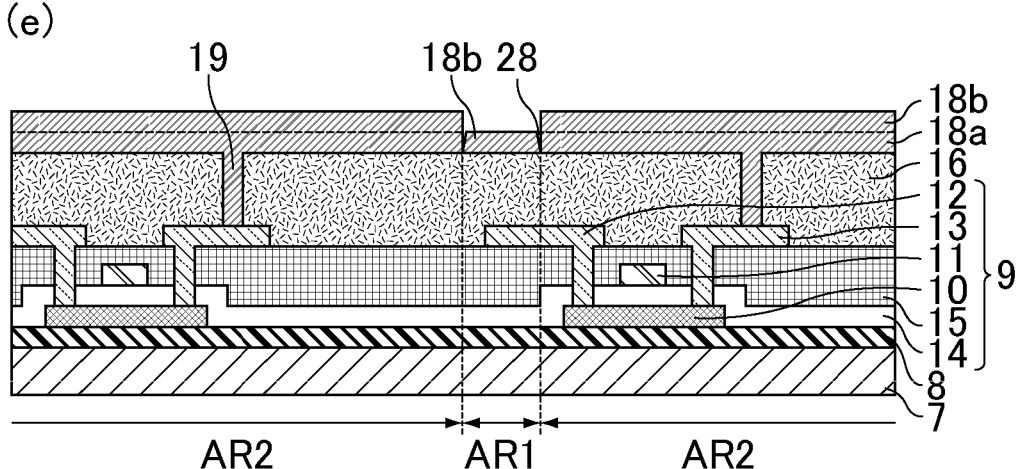
(f)
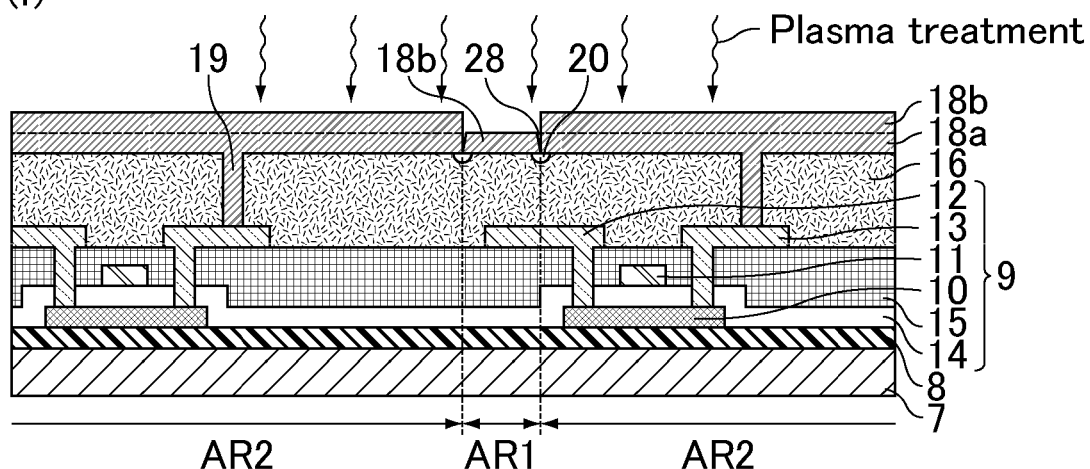
(g)
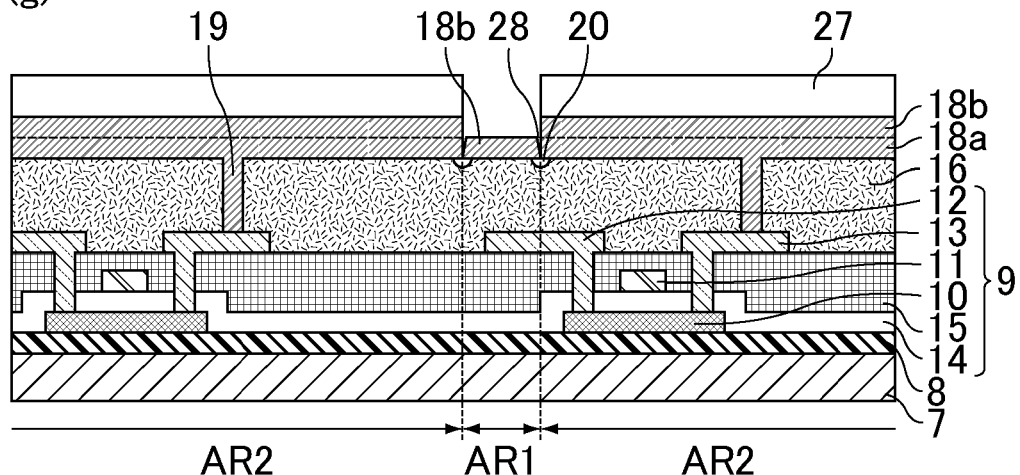

(h)

(j)

(k)

Fig. 7-1
(a)
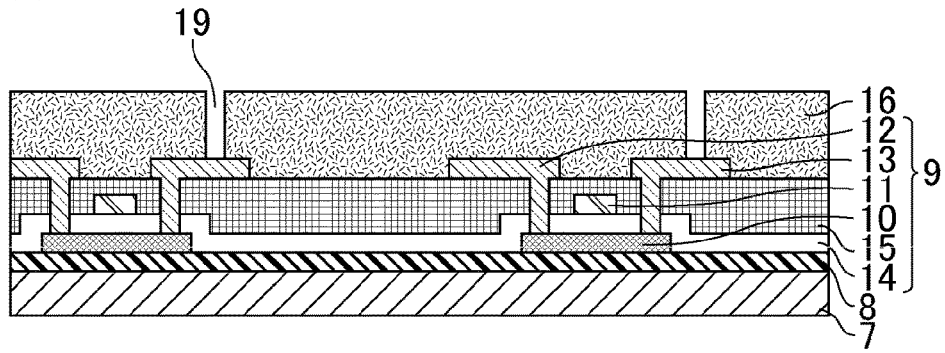
(b)
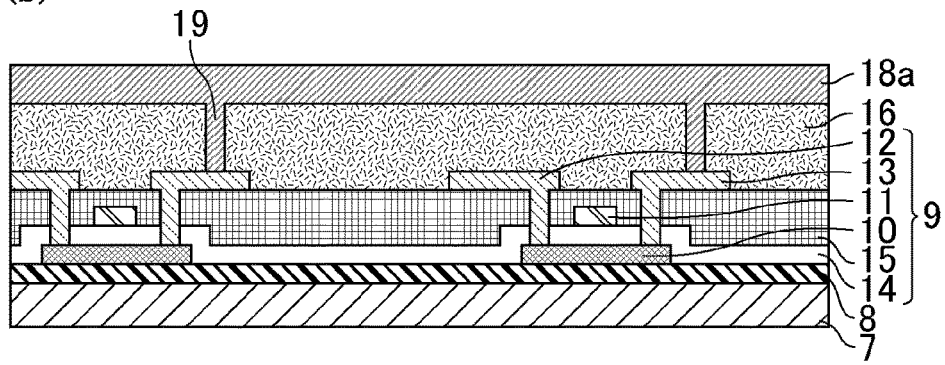
(c)
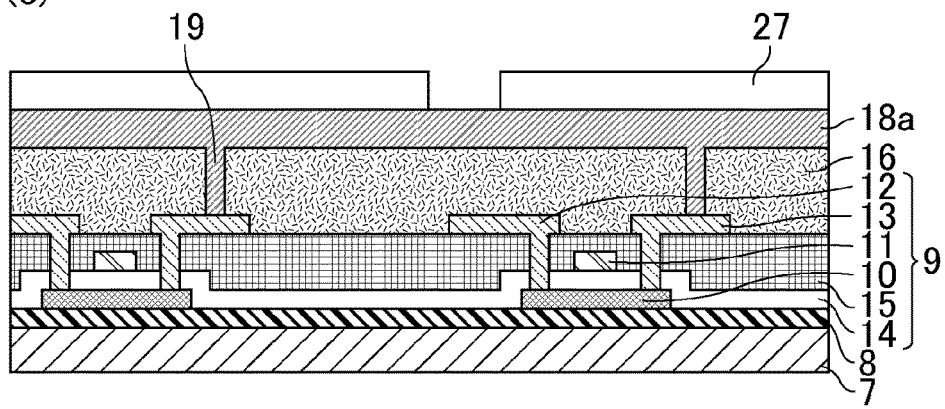
(d)
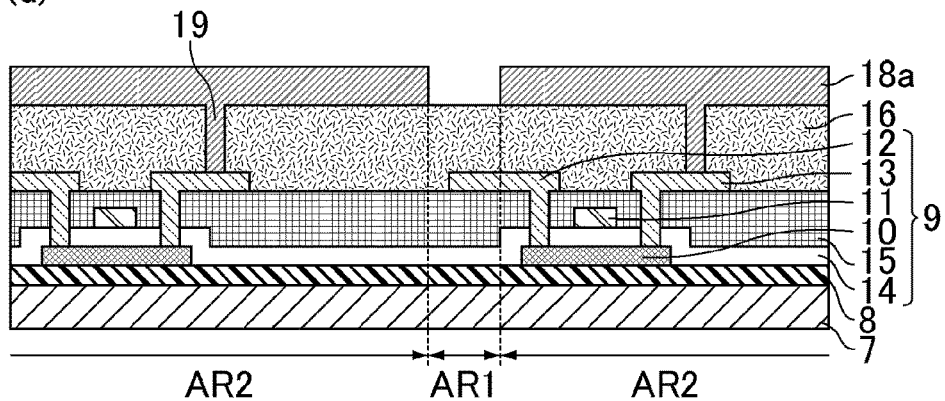

Fig. 7-2
(e)
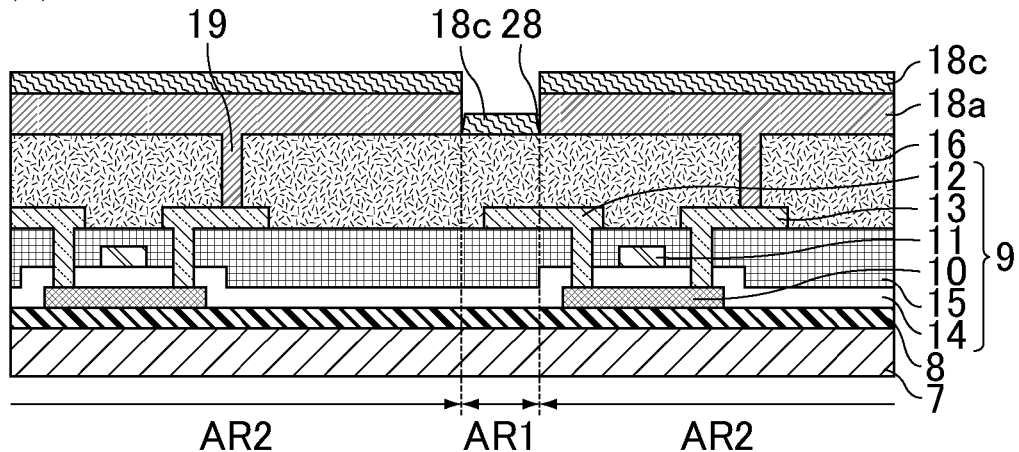
(f)
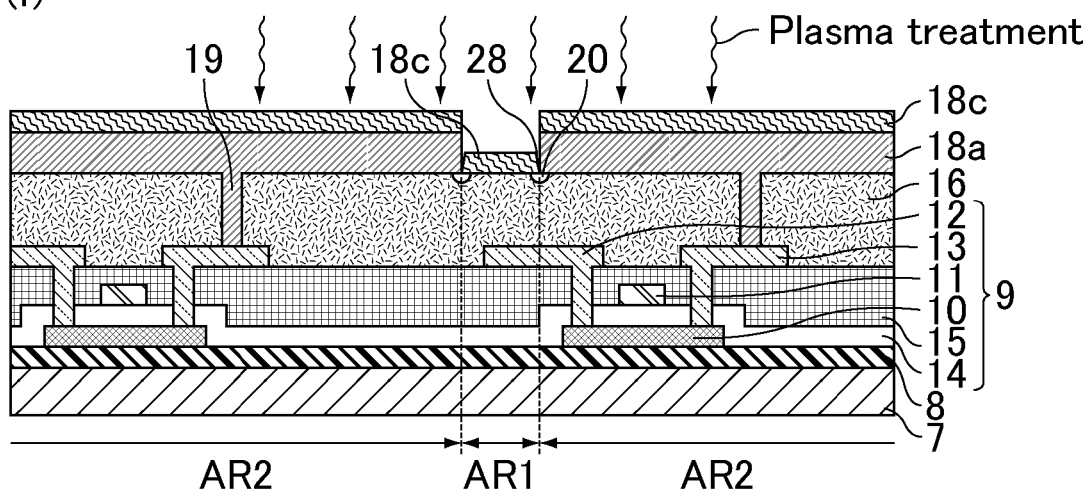
(g)
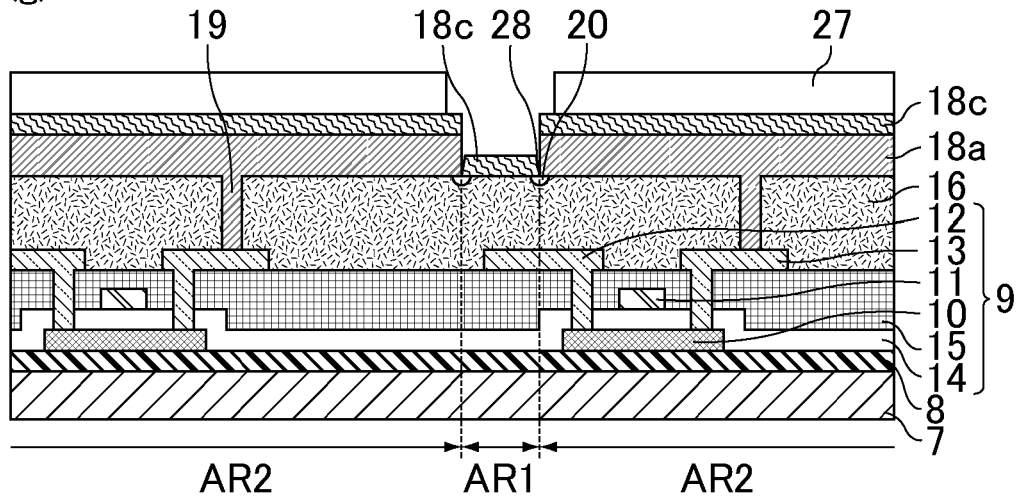

LIQUID CRYSTAL DISPLAY PANEL AND METHOD FOR PRODUCING LIQUID CRYSTAL DISPLAY PANEL

TECHNICAL FIELD

The present invention relates to liquid crystal display panels and methods for producing a liquid crystal display panel. The present invention specifically relates to a liquid crystal display panel including an organic insulating film and a method for producing the liquid crystal display panel.

BACKGROUND ART

Liquid crystal display panels are used in televisions, smartphones, tablet PCs, PCs, automotive navigation systems, and other applications. Liquid crystal display panels used in these applications need to have high reliability, and a variety of techniques for high reliability are proposed (for example, see Patent Literatures 1 to 3).

CITATION LIST

Patent Literature

Patent Literature 1: WO 2010/038514
Patent Literature 2: JP 2010-156723 A
Patent Literature 3: JP 2016-200698 A

SUMMARY OF INVENTION

Technical Problem

In some of conventional liquid crystal display panels, a thin-film transistor array substrate is designed such that a pixel electrode and a thin-film transistor element overlap each other with an organic insulating film in between to increase the aperture ratio. Unfortunately, such liquid crystal display panels may suffer the following issues. Specifically, for example, when the driving thereof leads to a temperature rise, high moisture absorbency of the organic insulating film (higher moisture absorbency thereof than an inorganic insulating film) causes generation of gas such as water vapor. This water vapor may permeate into the liquid crystal layer and emerge as bubbles. Additionally, when a production process of a liquid crystal display panel includes light application (e.g., a photo-alignment treatment on an alignment film), this light application may cause reactions such as reactions of unreacted components in the organic insulating film and photolysis reactions of components of the organic insulating film. These reactions generate low molecular weight components. In this case, an impact on the liquid crystal display panel from the outside may cause separation of the generated low molecular weight components from the organic insulating film and they are gasified. The resulting gas then may permeate into the liquid crystal layer and emerge as bubbles. Such emergence of bubbles in the liquid crystal layer (pixel region) may unfortunately result in display defects.

In response to such issues, a conventionally examined technique is to place on an organic insulating film a gas barrier layer that prevents movement of the gas generated from the organic insulating film. FIG. 8 is a schematic cross-sectional view of an example of a conventional liquid crystal display panel.

As illustrated in FIG. 8, a liquid crystal display panel 101 includes, sequentially from the back side to the viewing side, a first substrate 102, a first alignment film 103, a liquid crystal layer 104, a second alignment film 105, and a second substrate 106.

The first substrate 102 includes a first support 107, a base coat layer 108, a thin-film transistor element 109, an organic insulating film 116, a gas barrier layer 117, and a pixel electrode 118.

The thin-film transistor element 109 includes a semiconductor layer 110, a gate electrode 111, a source electrode 112, a drain electrode 113, a gate insulating film 114, and an interlayer insulating film 115. The semiconductor layer 110 is placed on a liquid crystal layer 104 side surface of the base coat layer 108 and is covered with the gate insulating film 114. The gate electrode 111 is placed on a liquid crystal layer 104 side surface of the gate insulating film 114 and is covered with the interlayer insulating film 115. The source electrode 112 and the drain electrode 113 are placed on a liquid crystal layer 104 side surface of the interlayer insulating film 115 and are covered with the organic insulating film 116. The source electrode 112 and the drain electrode 113 are electrically connected with the semiconductor layer 110 via openings (contact holes) in the gate insulating film 114 and the interlayer insulating film 115.

The gas barrier layer 117 is placed on a liquid crystal layer 104 side surface of the organic insulating film 116. The pixel electrode 118 is placed on a liquid crystal layer 104 side surface of the gas barrier layer 117 and is electrically connected with the drain electrode 113 via a contact hole 119 in the organic insulating film 116 and the gas barrier layer 117.

In the liquid crystal display panel 101, the gas barrier layer 117 is placed to reduce permeation of gas generated from the organic insulating film 116 into the liquid crystal layer 104. Still, in the liquid crystal display panel 101, the gas generated from the organic insulating film 116 may move along, for example, the boundaries between the contact holes 119 and the organic insulating film 116 to permeate into the liquid crystal layer 104 (see the arrows in FIG. 8), thereby emerging as bubbles. Thus, the liquid crystal display panel 101 still needs to be improved to reduce display defects. Also, in the liquid crystal display panel 101, the gas generated from the organic insulating film 116 may create a pressure to cause a crack in the gas barrier layer 117, thereby impairing the reliability.

As described above, conventional liquid crystal display panels need to achieve reduction of display defects due to bubbles, but no solution to this issue has been found. For example, the inventions disclosed in Patent Literatures 1 to 3 are insufficient in preventing permeation of gas generated from the organic insulating film into the liquid crystal layer, and thus need to be improved.

The present invention was made in view of the above state of the art, and aims to provide a liquid crystal display panel capable of reducing display defects due to bubbles and a method for producing the liquid crystal display panel.

Solution to Problem

The present inventor performed a variety of studies on a liquid crystal display panel capable of reducing display defects due to bubbles and a method for producing the liquid crystal display panel, and thereby focused on providing a site (refuge) capable of accumulating gas generated from the organic insulating film before permeation of the gas into the liquid crystal layer. The inventor then found that providing the organic insulating film with a void at a position overlapping an end of the pixel electrode allows the gas generated from the organic insulating film to accumulate in the void before permeation into the liquid crystal layer, reducing permeation of the gas into the liquid crystal layer. Thereby, the inventor arrived at the solution to the above issue to complete the present invention.

In other words, an aspect of the present invention may be a liquid crystal display panel including, sequentially from a back side to a viewing side: a first substrate; a liquid crystal layer; and a second substrate, the first substrate including, sequentially from a liquid crystal layer side, a pixel electrode and an organic insulating film in contact with the pixel electrode, the organic insulating film being provided with a void at a position overlapping an end of the pixel electrode.

In an aspect of the present invention, the second substrate may include a black matrix, and the void may overlap the black matrix.

In an aspect of the present invention, the liquid crystal display panel may further include a first alignment film on a viewing side surface of the first substrate, and the void may be sealed by the first alignment film.

In an aspect of the present invention, the void may have a width of 0.1 to 1 µm.

In an aspect of the present invention, the void may have a depth of 0.1 to 1 µm.

Another aspect of the present invention may be a method for producing a liquid crystal display panel that includes, sequentially from a back side to a viewing side, a first substrate, a liquid crystal layer, and a second substrate, the method sequentially including: a process (1) of sequentially stacking an organic insulating film and a first electrode on a viewing side of a first support to form a first area where a viewing side surface of the organic insulating film is exposed through the first electrode and a second area where the viewing side surface of the organic insulating film is not exposed through the first electrode; a process (2) of forming a second electrode on a viewing side of each of the first area and the second area; a process (3) of performing a plasma treatment on the first area and the second area from a second electrode side to form a void at a boundary between the first area and the second area in the organic insulating film; a process (4) of removing the second electrode in the first area to form the first substrate that includes a pixel electrode including the first electrode and the second electrode in the second area; and a process (5) of placing the liquid crystal layer between the first substrate and the second substrate, the organic insulating film being in contact with the pixel electrode, the void being placed at a position overlapping an end of the pixel electrode in the organic insulating film.

In another aspect of the present invention, the plasma treatment in the process (3) may be performed using $CF_4$ gas.

In another aspect of the present invention, the method for producing a liquid crystal display panel may further include, before the process (5), a process (6) of placing a black matrix on a back side of a second support to form the second substrate.

In another aspect of the present invention, the void may overlap the black matrix.

In another aspect of the present invention, the method for producing a liquid crystal display panel may further include, between the process (4) and the process (5), a process (7) of applying a first alignment material to a viewing side surface of the first substrate, and then drying and baking the first alignment material to form a first alignment film.

In another aspect of the present invention, in the process (7), a vacuum degassing treatment may be performed to discharge air in the void before drying the first alignment material.

In another aspect of the present invention, the void may be sealed by the first alignment film.

In another aspect of the present invention, the void may have a width of 0.1 to 1 µm.

In another aspect of the present invention, the void may have a depth of 0.1 to 1 µm.

Advantageous Effects of Invention

The present invention can provide a liquid crystal display panel capable of reducing display defects due to bubbles and a method for producing the liquid crystal display panel.

BRIEF DESCRIPTION OF THE DRAWINGS

FIG. 3-1 includes schematic cross-sectional views illustrating a method for producing the liquid crystal display panel of Embodiment 1 (steps a, b, c, and d).

FIG. 3-2 includes schematic cross-sectional views illustrating the method for producing the liquid crystal display panel of Embodiment 1 (steps e, f, and g).

FIG. 3-3 includes schematic cross-sectional views illustrating the method for producing the liquid crystal display panel of Embodiment 1 (steps h, j, and k).

FIG. 7-1 includes schematic cross-sectional views illustrating a method for producing the liquid crystal display panel of Embodiment 2 (steps a, b, c, and d).

FIG. 7-2 includes schematic cross-sectional views illustrating the method for producing the liquid crystal display panel of Embodiment 2 (steps e, f, and g).

FIG. 7-3 includes schematic cross-sectional views illustrating the method for producing the liquid crystal display panel of Embodiment 2 (steps h, j, and k).

DESCRIPTION OF EMBODIMENTS

Hereinafter, the present invention is described in more detail based on embodiments with reference to the drawings. The embodiments, however, are not intended to limit the scope of the present invention. The configurations of the embodiments may appropriately be combined or modified within the spirit of the present invention.

The phrase "X to Y" as used herein means "X or higher and Y or lower".

Embodiment 1

Figure 1:
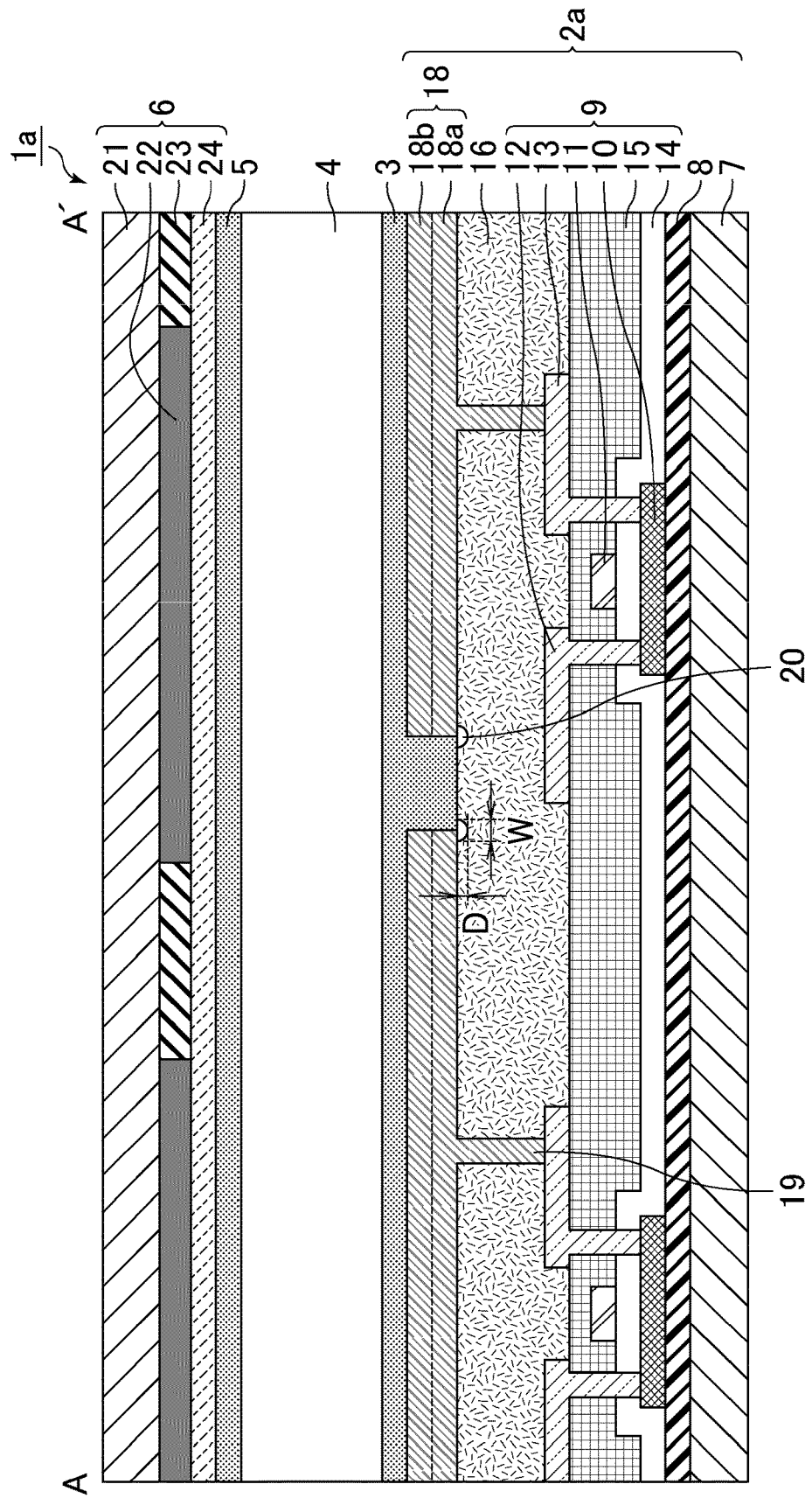
FIG. 1 is a schematic cross-sectional view of a liquid crystal display panel of Embodiment 1.
Figure 2:
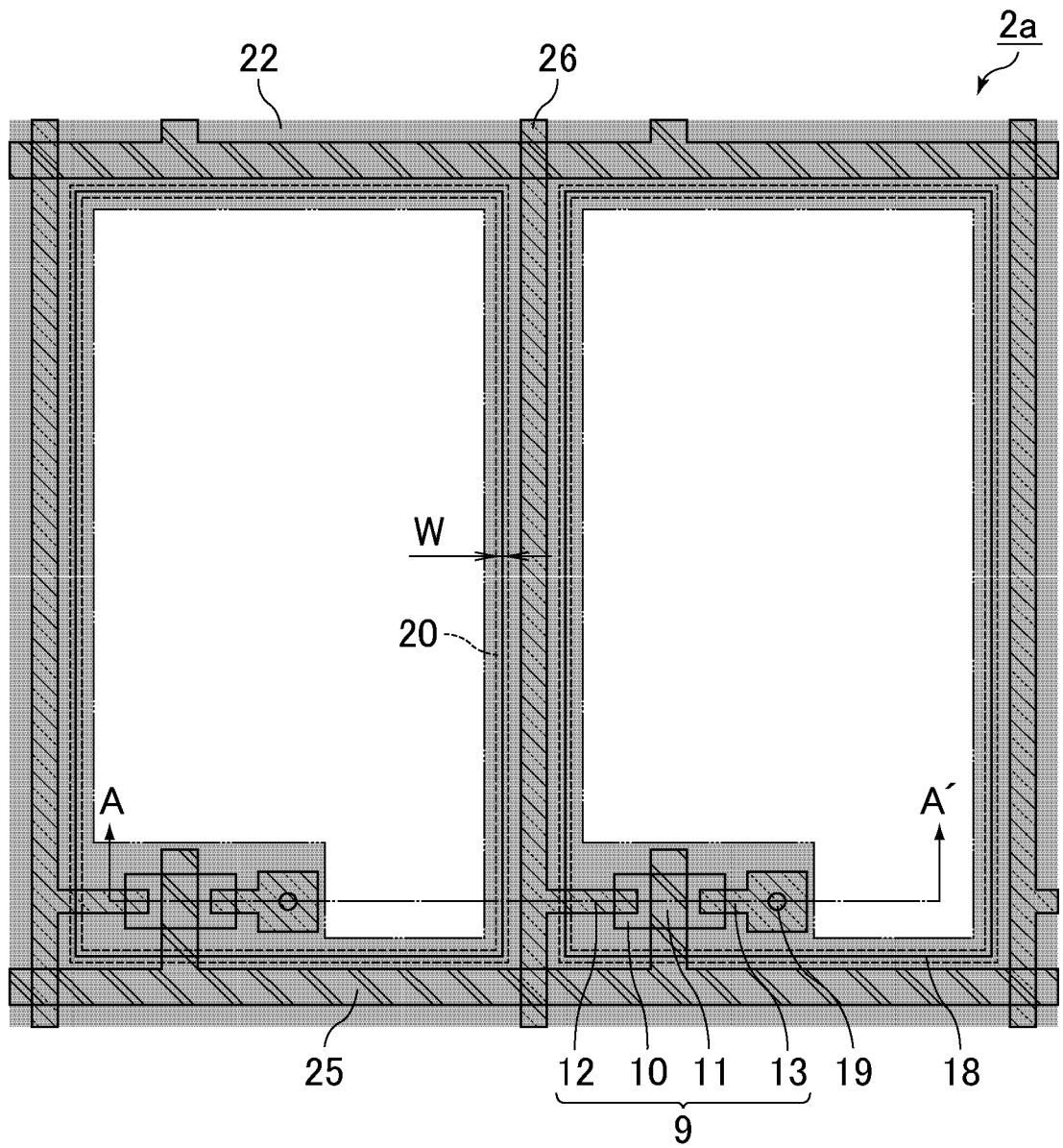
FIG. 2 is a Schematic plan view of the liquid crystal display panel of Embodiment 1.

Embodiment 1 relates to a transmissive liquid crystal display panel.
(1) Structure of Liquid Crystal Display Panel The structure of a liquid crystal display panel of Embodiment 1 is described hereinbelow with reference to FIGS. 1 and 2. FIG. 1 is a schematic cross-sectional view of the liquid crystal display panel of Embodiment 1. FIG. 2 is a schematic plan view of the liquid crystal display panel of Embodiment 1. FIG. 2 focuses on part of the structures of a first substrate and a second substrate of the liquid crystal display panel illustrated in FIG. 1 seen from the viewing side. FIG. 1 corresponds to the cross section taken along the line A-A' in FIG. 2.

A liquid crystal display panel 1a includes, sequentially from the back side to the viewing side, a first substrate 2a, a first alignment film 3, a liquid crystal layer 4, a second alignment film 5, and a second substrate 6.

(First Substrate)

The first substrate 2a includes a first support 7, a base coat layer 8, thin-film transistor elements 9, an organic insulating film 16, and pixel electrodes 18. In FIG. 1, a thin-film transistor array substrate is taken as an example of the first substrate 2a.

The first support 7 may be a glass substrate or a plastic substrate, for example.

A material of the base coat layer 8 may be an inorganic material such as silicon nitride (SiN) or silicon dioxide ($SiO_2$), for example.

Each thin-film transistor element 9 includes a semiconductor layer 10, a gate electrode 11, a source electrode 12, a drain electrode 13, a gate insulating film 14, and an interlayer insulating film 15. The semiconductor layer 10 is placed on the liquid crystal layer 4 side surface of the base coat layer 8 and is covered with the gate insulating film 14. The gate electrode 11 is placed on the liquid crystal layer 4 side surface of the gate insulating film 14 and is covered with the interlayer insulating film 15. The gate electrode 11 is electrically connected with a gate bus line 25. The source electrode 12 and the drain electrode 13 are placed on the liquid crystal layer 4 side surface of the interlayer insulating film 15 and are covered with the organic insulating film 16. The source electrode 12 and the drain electrode 13 are electrically connected with the semiconductor layer 10 via openings (contact holes) in the gate insulating film 14 and the interlayer insulating film 15. The source electrode 12 is electrically connected with a source bus line 26. In FIG. 1, a top-gate (staggered) thin-film transistor element is taken as an example of the thin-film transistor element 9.

A material of the semiconductor layer 10 may be amorphous silicon, polysilicon, or an oxide semiconductor, for example. In order to achieve low power consumption and high-speed driving, an oxide semiconductor is preferred. An oxide semiconductor causes small off-state leakage current (leakage current with the thin-film transistor element 9 in the off state) and can therefore lead to low power consumption, while causes large on-state current (current with the thin-film transistor element 9 in the on state) and can therefore lead to high-speed driving. Examples of the oxide semiconductor include compounds constituted by indium, gallium, zinc, and oxygen and compounds constituted by indium, tin, zinc, and oxygen.

Figure 8:
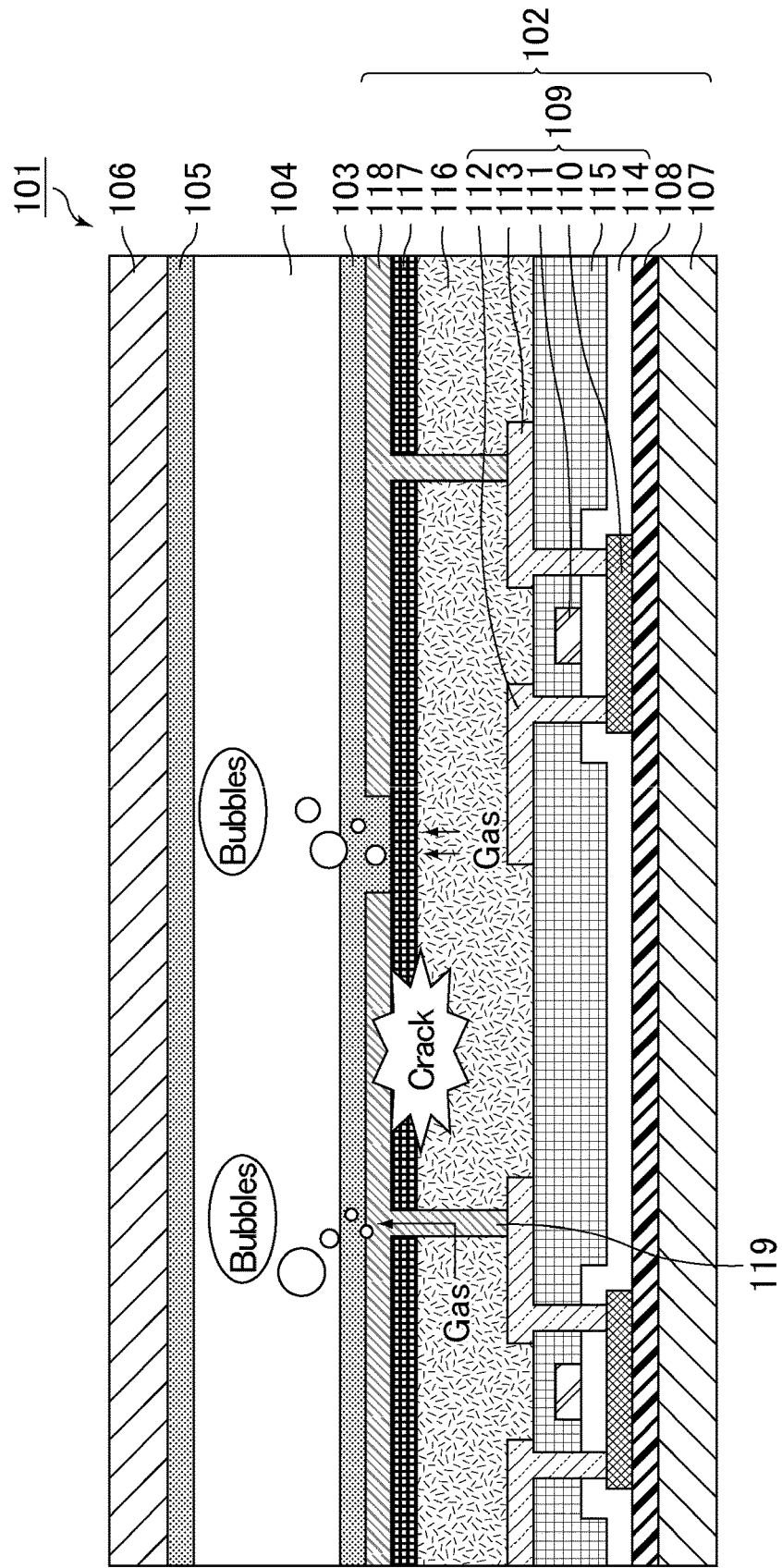
FIG. 8 is a schematic cross-sectional view of an example of a conventional liquid crystal display panel.

Each pixel electrode 18 is placed on the liquid crystal layer 4 side surface of the organic insulating film 16 and is electrically connected with the drain electrode 13 via a contact hole 19 in the organic insulating film 16. The pixel electrode 18 and the organic insulating film 16 are in contact with each other, so that no conventional gas barrier layer (e.g., the gas barrier layer 117 in FIG. 8) is placed between the pixel electrode 18 and the organic insulating film 16.

The pixel electrode 18 may be a monolayer of a single electrode, or may be a stack of multiple electrode species. In FIG. 1, a stack of a first electrode 18a and a second electrode 18b is taken as an example of the pixel electrode 18. The first electrode 18a and the second electrode 18b may be formed from the same material or different materials. When the first electrode 18a and the second electrode 18b are formed from the same material, no interface is present between the first electrode 18a and the second electrode 18b and the pixel electrode 18 is therefore a monolayer of a single electrode. When the first electrode 18a and the second electrode 18b are formed from different materials, the pixel electrode 18 is a stack of multiple electrode species.

When the liquid crystal display panel 1a is a transmissive one as in the case of the present embodiment, the pixel electrode 18 is a transparent electrode. In other words, the first electrode 18a and the second electrode 18b are transparent electrodes. The transparent electrode as used herein means an electrode having a light transmittance of 80% or higher. A material of the transparent electrode may be a transparent material (inorganic material) such as indium tin oxide (ITO) or indium zinc oxide (IZO).

The organic insulating film 16 is provided with voids 20 each at a position overlapping an end of the pixel electrode 18. This structure allows the gas generated from the organic insulating film 16 to accumulate in the voids 20 before permeation into the liquid crystal layer 4, thereby reducing permeation of the gas into the liquid crystal layer 4, i.e., generation of bubbles in the liquid crystal layer 4. This resultantly reduces display defects due to bubbles. When the pixel electrode 18 is a stack of multiple electrode species, an end of the electrode placed on the organic insulating film 16 side (the electrode in contact with the organic insulating film 16) among the multiple electrode species corresponds to an end of the pixel electrode 18.

According to the studies performed by the present inventor, the gas generated from the organic insulating film 16 moves not inside the pixel electrode 18 but along the interface (site with relatively low adhesion) between the organic insulating film 16 and the pixel electrode 18 to permeate into the liquid crystal layer 4 when the pixel electrode 18 (especially, the first electrode 18a on the organic insulating film 16 side) is formed from the aforementioned transparent material (inorganic material). In contrast, in the liquid crystal display panel 1a of the present embodiment, the voids 20 are placed on the route for permeation of the gas generated from the organic insulating film 16 into the liquid crystal layer 4. Thus, the gas generated from the organic insulating film 16 accumulates in the voids 20 before permeation into the liquid crystal layer 4.

Each void 20 preferably has a width W of 0.1 to 1 µm, more preferably 0.3 to 0.5 µm. A void 20 having a width W of smaller than 0.1 µm may have too small a capacity to efficiently accumulate the gas generated from the organic insulating film 16. A void 20 having a width W of greater than 1 µm may cause so large a region with no base (organic insulating film 16) of the pixel electrode 18 that the pixel electrode 18 may be easily broken. If the pixel electrode 18 is broken, a piece of the broken electrode may serve as an electrical bridge between adjacent pixel electrodes 18, possibly causing display defects.

Each void 20 preferably has a depth D of 0.1 to 1 µm, more preferably 0.1 to 0.3 µm. A void 20 having a depth D of smaller than 0.1 µm may have too small a capacity to efficiently accumulate the gas generated from the organic insulating film 16. A void 20 having a depth D of greater than 1 µm may cause a change in potential at an end of the pixel electrode 18 to significantly disturb an electric field applied to the liquid crystal layer 4, impairing the display quality. Such impaired display quality may be observed as defects such as occurrence of light leakage and reduction in contrast ratio around an end of a black matrix 22 to be described later in a plan view of the liquid crystal display panel 1a.

The width W and depth D of each void 20 can be measured using a scanning electron microscope (SEM), a laser microscope, an optical microscope, or the like. In order to achieve high measurement accuracy, they are preferably measured on a cross-sectional picture taken by a scanning electron microscope. When the first substrate 2a to be used in the production includes multiple panels, arranged in a matrix pattern (each panel includes multiple pixels as illustrated in FIG. 2), the width W and depth D of the void 20 are each preferably an average of the widths and an average of the depths, each of which is calculated as follows, for the following two panels, i.e., a panel near the center of the first substrate 2a and one of the four panels at the four corners. In calculation of the averages, the widths and the depths of the voids are measured at any 5 to 10 points for each of the two panels, and the measured widths and the measured depths are averaged to give the average of the widths and the average of the depths.

In a plan view of the first substrate 2a, each void 20 may be placed along the entire periphery of the pixel electrode 18 as illustrated in FIG. 2, or may be placed along only a part of the periphery of the pixel electrode 18. In order to efficiently accumulate the gas generated from the organic insulating film 16, the voids 20 are each preferably placed along the entire periphery of the pixel electrode 18.

Each void 20 may be in a vacuum state (in a state of lower than $1 \times 10^2$ Pa) or may be in a decompressed state (in a state of $1 \times 10^2$ to $1 \times 10^5$ Pa). In order to efficiently accumulate the gas generated from the organic insulating film 16, the void 20 is preferably in a vacuum state.

A material of the organic insulating film 16 may be an ultraviolet-curable resin such as a naphthoquinone diazide-based resin or a polyalkylsiloxane-based resin.

(First Alignment Film)

The first alignment film 3 is placed on the liquid crystal layer 4 side surface of the first substrate 2a and covers the pixel electrodes 18.

As illustrated in FIG. 1, the voids 20 are preferably sealed by the first alignment film 3. This structure can hermetically seal the voids 20 and enables efficient accumulation of the gas generated from the organic insulating film 16. The first alignment film 3 may partially be present in the voids 20 as long as it does not inhibit accumulation of the gas generated from the organic insulating film 16 in the voids 20.

The first alignment film 3 may be a monolayer of a single alignment film or may be a stack of multiple alignment film species. When the first alignment film 3 is a stack of multiple alignment film species, the alignment film placed on the liquid crystal layer 4 side among the multiple alignment film species may mainly function to control the alignment of liquid crystal molecules in the liquid crystal layer 4 and the alignment film on the side remote from the liquid crystal layer 4 may mainly function to control the electric properties and the mechanical strength.

The first alignment film 3 may be either an organic alignment film or an inorganic alignment film, and may be a rubbing alignment film or a photo-alignment film, for example.

(Liquid Crystal Layer)

A material of the liquid crystal layer 4 may be either a positive liquid crystal material having positive anisotropy of dielectric constant or a negative liquid crystal material having negative anisotropy of dielectric constant.

(Second Substrate)

The second substrate 6 includes a second support 21, the black matrix 22, a color filter layer 23, and a common electrode 24. In FIG. 1, a color filter substrate is taken as an example of the second substrate 6.

The second support 21 may be a glass substrate or a plastic substrate, for example.

The black matrix 22 is placed on the liquid crystal layer 4 side surface of the second support 21. As illustrated in FIGS. 1 and 2, the voids 20 preferably overlap the black matrix 22. This structure can shade a region including a void 20 with the black matrix 22 in a plan view of the liquid crystal display panel 1a, minimizing the influence on the display quality. The two-dot chain line in FIG. 2 schematically indicates the edge (contour) of the black matrix 22, and the hatched portion indicates the position of the black matrix 22.

A material of the black matrix 22 may be a black resist, for example.

The color filter layer 23 is placed on the liquid crystal layer 4 side surface of the second support 21 separately from the black matrix 22.

The color filter layer 23 may be a color filter layer of a single color or may be a color filter layer of multiple colors. When the color filter layer 23 is a color filter layer of multiple colors, the colors may be in any combination, such as a combination of red, green, and blue, a combination of red, green, blue, and yellow, or a combination of red, green, blue, and white.

A material of the color filter layer 23 may be a pigment-dispersed color resist, for example.

The common electrode 24 is placed on the liquid crystal layer 4 side surfaces of the black matrix 22 and the color filter layer 23.

A material of the common electrode 24 may be a transparent material (inorganic material) such as indium tin oxide (ITO) or indium zinc oxide (IZO).

(Second Alignment Film)

The second alignment film 5 is placed on the liquid crystal layer 4 side surface of the second substrate 6 and covers the common electrode 24.

The second alignment film 5 may be a monolayer of a single alignment film or may be a stack of multiple alignment film species. When the second alignment film 5 is a stack of multiple alignment film species, the alignment film placed on the liquid crystal layer 4 side among the multiple alignment film species may mainly function to control the alignment of liquid crystal molecules in the liquid crystal layer 4 and the alignment film on the side remote from the liquid crystal layer 4 may mainly function to control the electric properties and the mechanical strength.

The second alignment film 5 may be either an organic alignment film or an inorganic alignment film, and may be a rubbing alignment film or a photo-alignment film. The photo-alignment film may be a photo-alignment film containing a photo-reactive functional group such as a cinnamate group, a chalcone group, or an azobenzene group, for example.

The liquid crystal display panel 1a may be driven by any display mode, such as a vertical alignment mode, e.g., the vertical alignment (VA) mode, or a horizontal alignment mode, e.g., the in-plane switching (IPS) mode or the fringe field switching (FFS) mode. In order to easily shade a region including a void 20 with the black matrix 22 in a plan view of the liquid crystal display panel 1a, preferred is a display mode having the pixel structure as illustrated in FIGS. 1 and 2 (e.g., the VA mode).

(2) Method for Producing a Liquid Crystal Display Panel

Figure 3:
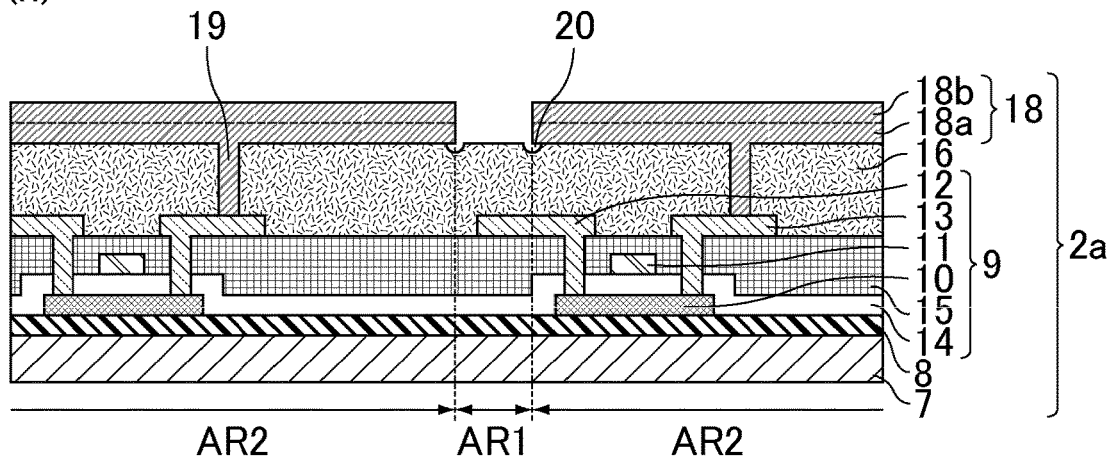
Figure 3:
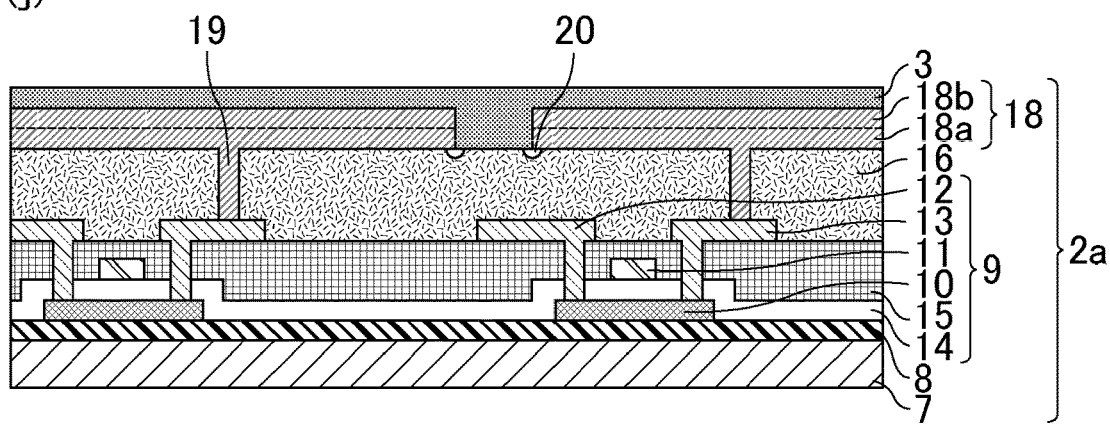
Figure 3:
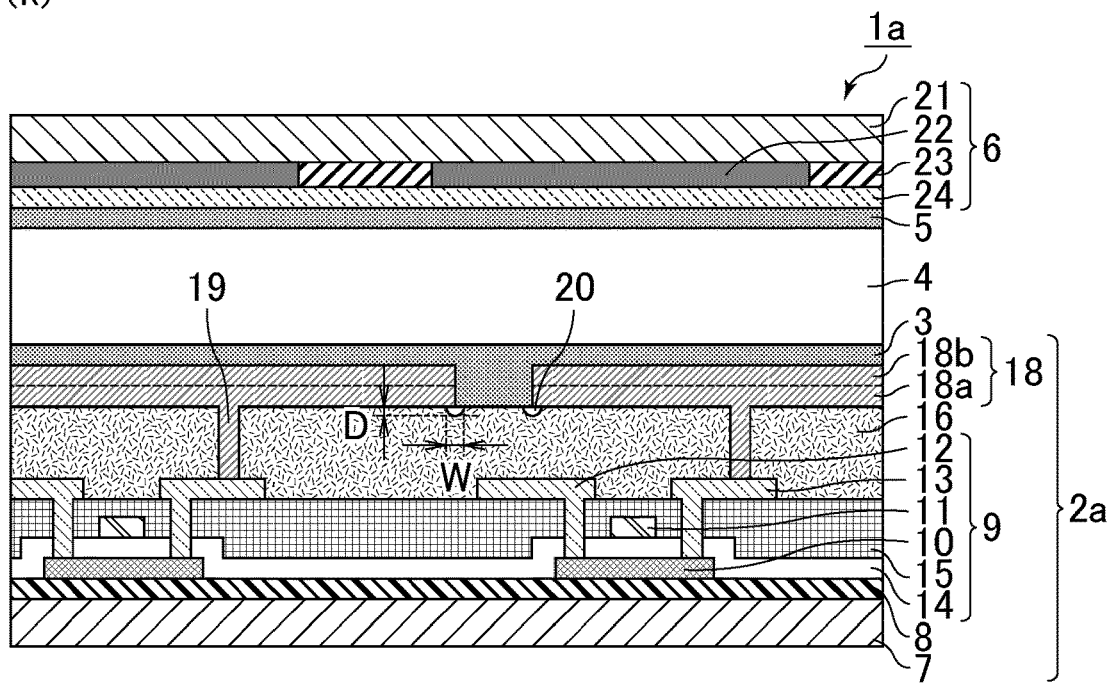

A method for producing the liquid crystal display panel of Embodiment 1 is described hereinbelow with reference to FIGS. 3-1 to 3-3. FIG. 3-1 includes schematic cross-sectional views illustrating a method for producing the liquid crystal display panel of Embodiment 1 (steps a, b, c, and d). FIG. 3-2 includes schematic cross-sectional views illustrating the method for producing the liquid crystal display panel of Embodiment 1 (steps e, f, and g). FIG. 3-3 includes schematic cross-sectional views illustrating the method for producing the liquid crystal display panel of Embodiment 1 (steps h, j, and k). For the method for producing the liquid crystal display panel of Embodiment 1, the descriptions of the same contents as for the aforementioned liquid crystal display panel of Embodiment 1 are omitted as appropriate.

(a) Formation of Thin-Film Transistor Elements and Organic Insulating Film

As illustrated in FIG. 3-1(a), the base coat layer 8 and the thin-film transistor elements 9 (thin-film transistor elements each including the semiconductor layer 10, the gate electrode 11, the source electrode 12, the drain electrode 13, the gate insulating film 14, and the interlayer insulating film 15) are formed on the viewing side surface of the first support 7 by a conventionally known method. The organic insulating film 16 is then formed so as to cover the source electrodes 12 and the drain electrodes 13. In this step, the organic insulating film 16 is provided with the contact holes 19 by photolithography so as to expose part of each drain electrode 13.

(b) Formation of First Electrode

As illustrated in FIG. 3-1(b), the first electrode 18a (transparent electrode) is formed on the viewing side surface of the organic insulating film 16. As a result, the first electrode 18a is electrically connected with the drain electrodes 13 via the contact holes 19. In this step, the thickness of the first electrode 18a is thinner than the thickness (designed value) of the final target transparent electrode (the whole pixel electrode, in the present embodiment), preferably 30 to 70% of the target thickness.

The first electrode 18a may be either a monolayer of a single electrode or a stack of multiple electrode species.

The first electrode 18a may be formed by chemical vapor deposition (CVD) or sputtering, for example.

(c) Formation of Photoresist

As illustrated in FIG. 3-1(c), a photoresist 27 is partially formed on the viewing side surface of the first electrode 18a. As a result, the first electrode 18a is partially exposed through the photoresist 27.

(d) Division of First Electrode

The exposed parts of the first electrode 18a are removed by etching, and then the photoresist 27 is removed. Thereby, as illustrated in FIG. 3-1(d), the first electrode 18a is divided into parts for the respective pixels. This provides a first area AR1 where the viewing side surface of the organic insulating film 16 is exposed through the first electrode 18a and a second area AR2 where the viewing side surface of the organic insulating film 16 is not exposed through the first electrode 18a (is covered with the first electrode 18a).

The technique of etching the first electrode 18a may be wet etching or dry etching, for example, and may be selected as appropriate in accordance with the material of the first electrode 18a.

(e) Formation of Second Electrode

Figure 4:
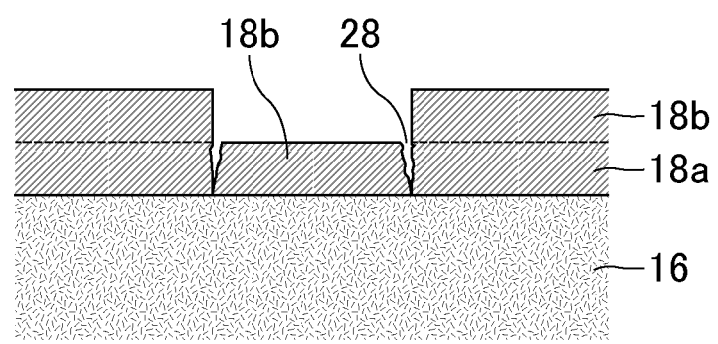
FIG. 4 is an enlarged schematic cross-sectional view of a first area and its vicinity in FIG. 3-2(e).

As illustrated in FIG. 3-2(e), the second electrode 18b (transparent electrode) is formed on the viewing side (entire surface) of the first area AR1 and the second area AR2. In this step, the second electrode 18b is formed such that the stack of the first electrode 18a and the second electrode 18b in the second area AR2 has the thickness (designed thickness) of the final target transparent electrode (the whole pixel electrode, in the present embodiment). In the first area AR1, the organic insulating film 16 is the base. Thus, the second electrode 18b less spreads in the lateral direction and does not closely adhere to the first electrode 18a that has already been formed, so that gaps 28 are formed between each first electrode 18a and the second electrode 18b. FIG. 4 is an enlarged schematic cross-sectional view of the first area and its vicinity in FIG. 3-2(e). In FIG. 4, gaps that can be recognized in appearance between each first electrode 18a and the second electrode 18b are taken as an example of the gaps 28. Still, the gap encompasses any internal structure (that cannot be recognized in appearance) such as a cavity (including a portion having a low film density).

The second electrode 18b may be either a monolayer of a single electrode or a stack of multiple electrode species.

The second electrode 18b may be formed by chemical vapor deposition (CVD) or sputtering, for example.

(f) Formation of Voids

As illustrated in FIG. 3-2(f), the first area AR1 and the second area AR2 are subjected to a plasma treatment from the second electrode 18b side. Plasma enters the organic insulating film 16 through the gaps 28 and the voids 20 are resultantly formed at the boundaries of the first area AR1 and the second area AR2 in the organic insulating film 16.

Examples of gas used in the plasma treatment include $CF_4$ gas, $O_2$ gas, $N_2$ gas, Ar gas, Cl gas, and any gas mixture thereof. These gases have a function of etching the organic insulating film 16 while having substantially no function of etching the first electrode 18a and the second electrode 18b. Preferred among these is $CF_4$ gas for the following reasons (A) and (B).

(A) $CF_4$ gas has an effect of controlling the tapered shape of the stack of the first electrode 18a and the second electrode 18b to a normally tapered shape.

(B) $CF_4$ gas exhibits a lower rate of etching the organic insulating film 16 than the other gases, so that it can more easily control the voids 20 to a desired size (capacity).

(g) Formation of Photoresist

As illustrated in FIG. 3-2(g), the photoresist 27 is formed on the viewing side surface of the second electrode 18b in the second area AR2. As a result, the second electrode 18b in the first area AR1 is exposed through the photoresist 27.

(h) Formation of Pixel Electrodes

The second electrode 18b in the first area AR1 is removed by etching, and then the photoresist 27 is removed. Thereby, as illustrated in FIG. 3-3(h), the pixel electrodes 18 each of which is a stack of the first electrode 18a and the second electrode 18b is formed in the second area AR2. Consequently, the first substrate 2a is completed.

The technique of etching the second electrode 18b may be wet etching or dry etching, for example, and may be selected as appropriate in accordance with the material of the second electrode 18b.

(j) Formation of First Alignment Film

As illustrated in FIG. 3-3(j), the first alignment film 3 is formed on the viewing side surface of the first substrate 2a. Specifically, first, a first alignment material is applied to the viewing side surface of the first substrate 2a. The first alignment material is then dried and baked, so that the first alignment film 3 is formed.

In formation of the first alignment film 3, a vacuum degassing treatment is preferably performed to discharge the air in the voids 20 before drying the first alignment material. The vacuum degassing treatment makes the voids 20 in a vacuum state. As the drying and baking of the first alignment material is performed in this state, the voids 20 are sealed by the first alignment film 3 while they are in a vacuum state. As a result, the voids 20 can more efficiently accumulate the gas generated from the organic insulating film 16. Even without the vacuum degassing treatment, the baking can cause the first alignment material (first alignment film 3) to shrink and make the voids 20 in a decompressed state. Thus, the voids 20 can efficiently accumulate the gas generated from the organic insulating film 16.

As illustrated in FIG. 3-3(*j*), the voids 20 are preferably sealed by the first alignment film 3. This structure can hermetically seal the voids 20 and enables efficient accumulation of the gas generated from the organic insulating film 16. The first alignment film 3 may partially be present in the voids 20 as long as it does not inhibit accumulation of the gas generated from the organic insulating film 16 in the void 20. In the production method of the present embodiment, the pixel electrodes 18 serve as eaves for the voids 20. Thus, even when the first alignment film 3 is slightly present in the voids 20, it does not completely fill the voids 20.

The first alignment material may be a polyimide-based alignment material (alignment material for a rubbing alignment film) or an alignment material (alignment material for a photo-alignment film) containing a photo-reactive functional group (e.g., a cinnamate group, a chalcone group, or an azobenzene group).

(k) Completion of Liquid Crystal Display Panel

A material of the liquid crystal layer 4 is dropped on a surface of at least one of the first substrate 2*a* or the second substrate 6, and the first substrate 2*a* and the second substrate 6 are attached to each other. As a result, the liquid crystal display panel 1*a* as, illustrated in FIG. 3-3(*k*) is completed. In the liquid crystal display panel 1*a*, the voids 20 are each placed at a position overlapping an end of the pixel electrode 18. The organic insulating film 16 is in contact with each pixel electrode 18 (first electrode 18*a*).

The second substrate 6 may be formed as follows before attached to the first substrate 2*a*. First, the black matrix 22 and the color filter layer 23 are formed side by side on the back side surface of the second support 21. Then, the common electrode 24 is formed on the back side surfaces of the black matrix 22 and the color filter layer 23. As a result, the second substrate 6 is completed.

As illustrated in FIG. 3-3(*k*), the voids 20 preferably overlap the black matrix 22. This structure can shade a region including a void 20 with the black matrix 22 in a plan view of the liquid crystal display panel 1*a*, minimizing the influence on the display quality.

As illustrated in FIG. 3-3(*k*), on the back side surface of the second substrate 6 may be formed the second alignment film 5. The second alignment film 5 can be formed by the same method as for the first alignment film 3.

The first alignment film 3 and the second alignment film 5 may be subjected to an alignment treatment such as a rubbing treatment or a photo-alignment treatment before attaching the first substrate 2*a* and the second substrate 6.

The production method of the present embodiment can provide the voids 20 each at a position overlapping an end of the pixel electrode 18 in the organic insulating film 16. This allows the gas generated from the organic insulating film 16 to accumulate in the voids 20 before permeation into the liquid crystal layer 4, thereby reducing permeation of the gas into the liquid crystal layer 4, i.e., generation of bubbles in the liquid crystal layer 4. This resultantly reduces display defects due to bubbles.

According to the studies performed by the present inventor, the gas generated from the organic insulating film 16 moves not inside the pixel electrode 18 but along the interface (site with relatively low adhesion) between the organic insulating film 16 and the pixel electrode 18 to permeate into the liquid crystal layer 4 when the pixel electrode 18 (especially, the first electrode 18*a* on the organic insulating film 16 side) is formed from the aforementioned transparent material (inorganic material). In contrast, in the production method of the present embodiment, the voids 20 are placed on the route for permeation of the gas generated from the organic insulating film 16 into the liquid crystal layer 4. Thus, the gas generated from the organic insulating film 16 accumulates in the voids 20 before permeation into the liquid crystal layer 4.

In the production method of the present embodiment, the organic insulating film 16 and each pixel electrode 18 (first electrode 18*a*) are in contact with each other and no conventional gas barrier layer (e.g., the gas barrier layer 117 in FIG. 8) is placed. This can eliminate the step of forming a gas barrier layer in comparison with conventional production methods, improving the efficiency of producing a liquid crystal display panel.

Each void 20 preferably has a width W of 0.1 to 1 μm, more preferably 0.3 to 0.5 μm. A void 20 having a width W of smaller than 0.1 μm may have too small a capacity to efficiently accumulate the gas generated from the organic insulating film 16. A void 20 having a width W of greater than 1 μm may cause so large a region with no base (organic insulating film 16) of the pixel electrode 18 that the pixel electrode 18 may be easily broken. If the pixel electrode 18 is broken, a piece of the broken electrode may serve as an electrical bridge between adjacent pixel electrodes 18, possibly causing display defects.

Each void 20 preferably has a depth D of 0.1 to 1 μm, more preferably 0.1 to 0.3 μm. A void 20 having a depth D of smaller than 0.1 μm may have too small a capacity to efficiently accumulate the gas generated from the organic insulating film 16. A void 20 having a depth D of greater than 1 μm may cause a change in potential at an end of the pixel electrode 18 to significantly disturb an electric field applied to the liquid crystal layer 4, impairing the display quality. Such impaired display quality may be observed as defects such as occurrence of light leakage and reduction in contrast ratio around an end of the black matrix 22 in a plan view of the liquid crystal display panel 1*a*.

In a plan view of the first substrate 2*a*, each void 20 may be placed along the entire periphery of the pixel electrode 18, or may be placed along only a part of the periphery of the pixel electrode 18. In order to efficiently accumulate the gas generated from the organic insulating film 16, the voids 20 are each preferably placed along the entire periphery of the pixel electrode 18. In the production method of the present embodiment, the plasma treatment is performed on the entire surface as illustrated in FIG. 3-2(*f*). Thus, the voids 20 each can easily be formed along the entire periphery of the pixel electrode 18. A void 20 may be formed along only a part of the periphery of the pixel electrode 18 or the capacity of a void 20 may be partially changed by changing the plasma density at positions in the plasma treatment. The plasma density may decrease from the center of the treatment target toward the outside in some cases. Thus, in a pixel placed closer to the outside (e.g., at an end) of the liquid crystal display panel 1*a*, the void 20 may be placed along only a part of the periphery of the pixel electrode 18. When the first substrate 2a to be used in the production includes multiple panels arranged in a matrix pattern (each panel includes multiple pixels as illustrated in FIG. 2), the voids 20 in a panel placed closer to the outside (e.g., at an end) each may be placed along only a part of the periphery of the pixel electrode 18.

Embodiment 2

Figure 5:
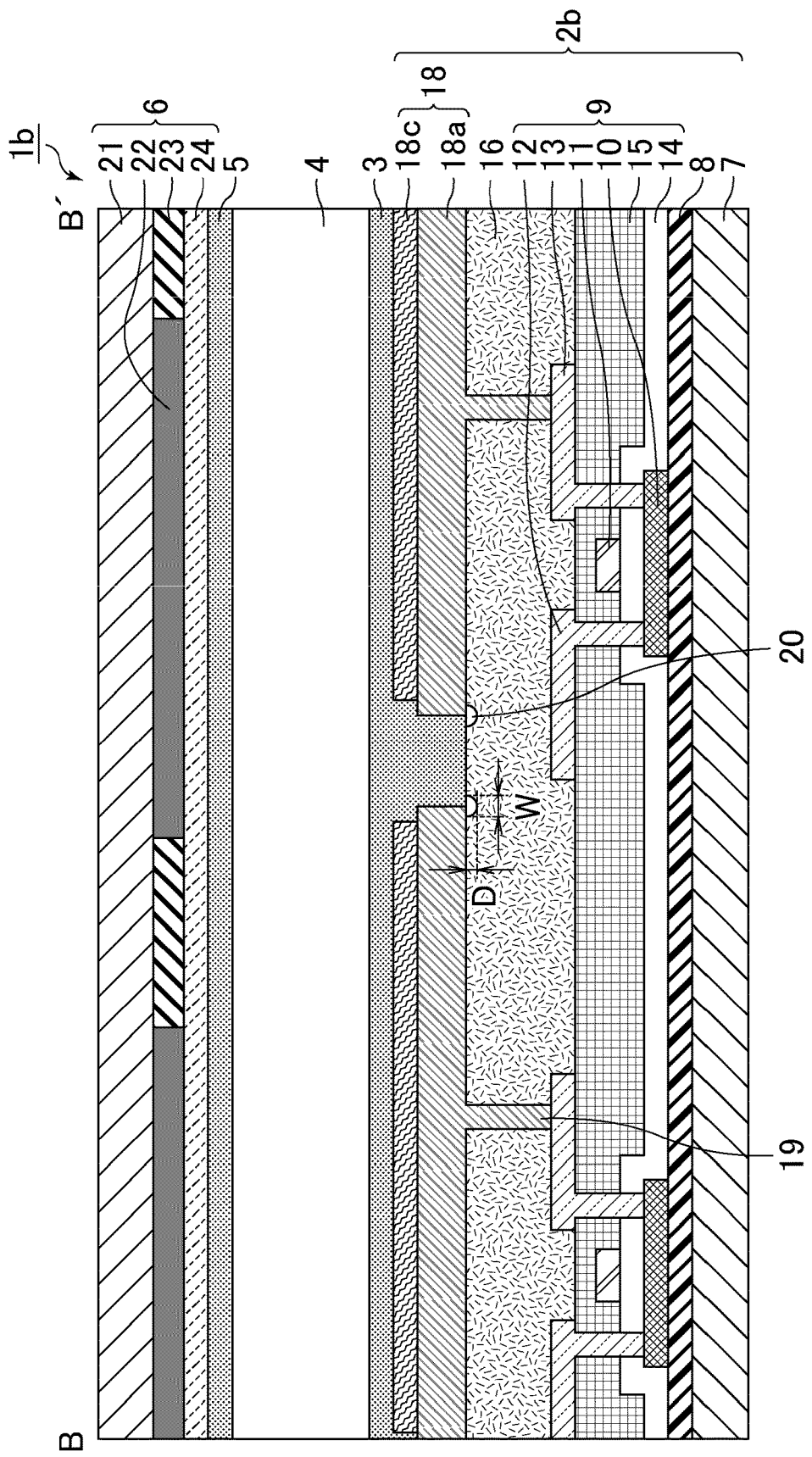
FIG. 5 is a schematic cross-sectional view of a liquid crystal display panel of Embodiment 2.
Figure 6:
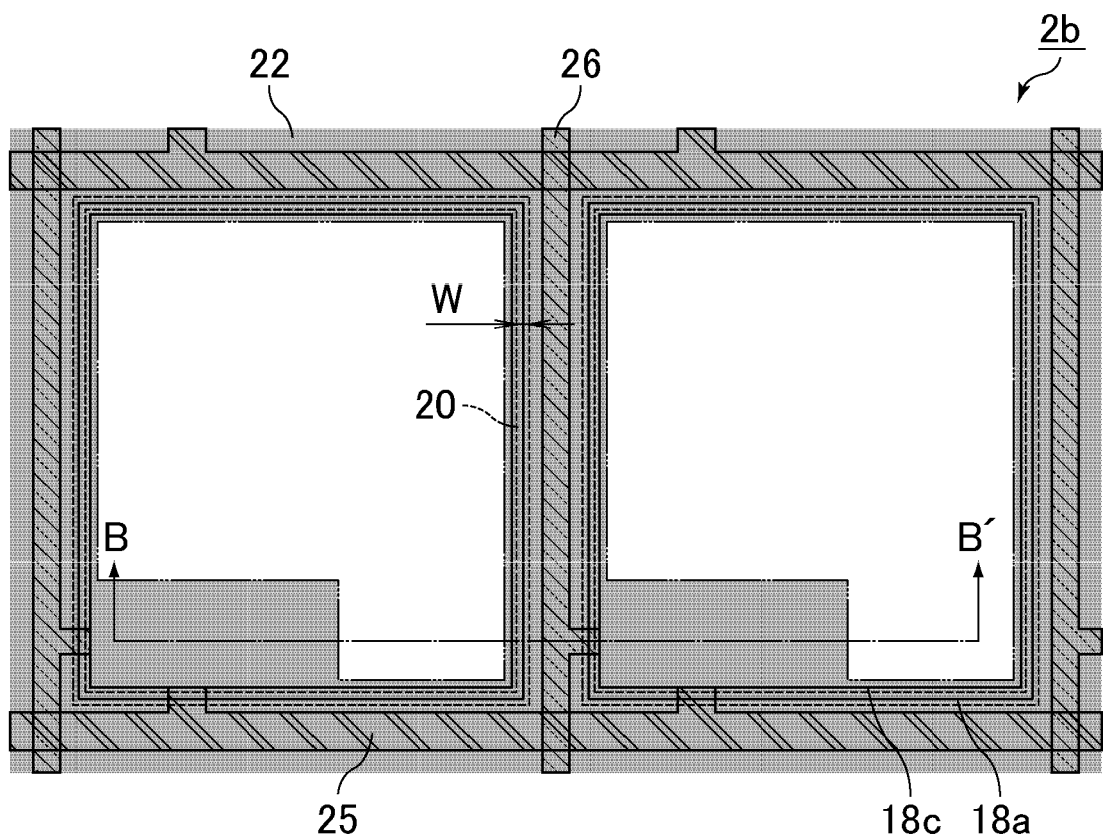
FIG. 6 is a schematic plan view of the liquid crystal display panel of Embodiment 2.

Embodiment 2 relates to a reflective liquid crystal display panel.
(1) Structure of Liquid Crystal Display Panel The structure of a liquid crystal display panel of Embodiment 2 is described hereinbelow with reference to FIGS. 5 and 6. FIG. 5 is a schematic cross-sectional view of the liquid crystal display panel of Embodiment 2. FIG. 6 is a schematic plan view of the liquid crystal display panel of Embodiment 2. FIG. 6 focuses on part of the structures of a first substrate and a second substrate of the liquid crystal display panel illustrated in FIG. 5 seen from the viewing side. FIG. 5 corresponds to the cross section taken along the line B-B' in FIG. 6. The liquid crystal display panel of Embodiment 2 is the same as the liquid crystal display panel of Embodiment 1, except for the structure of the second electrode. Thus, the descriptions of the same features are omitted as appropriate.

A liquid crystal display panel 1b includes, sequentially from the back side to the viewing side, a first substrate 2b, the first alignment film 3, the liquid crystal layer 4, the second alignment film 5, and the second substrate 6.
(First Substrate)

The first substrate 2b includes the first support 7, the base coat layer 8, the thin-film transistor elements 9, the organic insulating film 16, and the pixel electrodes 18.

In FIG. 5, a stack of the first electrode 18a and a second electrode 18c is taken as an example of the pixel electrode 1a. When the liquid crystal display panel 1b is a reflective one as in the case of the present embodiment, at least one of the first electrode 18a or the second electrode 18c is a reflective electrode. The following describes the case where the first electrode 18a is a transparent electrode and the second electrode 18c is a reflective electrode. The reflective electrode as used herein means an electrode having a light reflectance of 70% or higher. A material of the reflective electrode may be a reflective material (inorganic material) such as aluminum, silver, or an alloy thereof. The reflective electrode may be provided with fine openings. In this case, the liquid crystal display panel 1b is a transflective liquid crystal display panel.

Figures 3, 7:
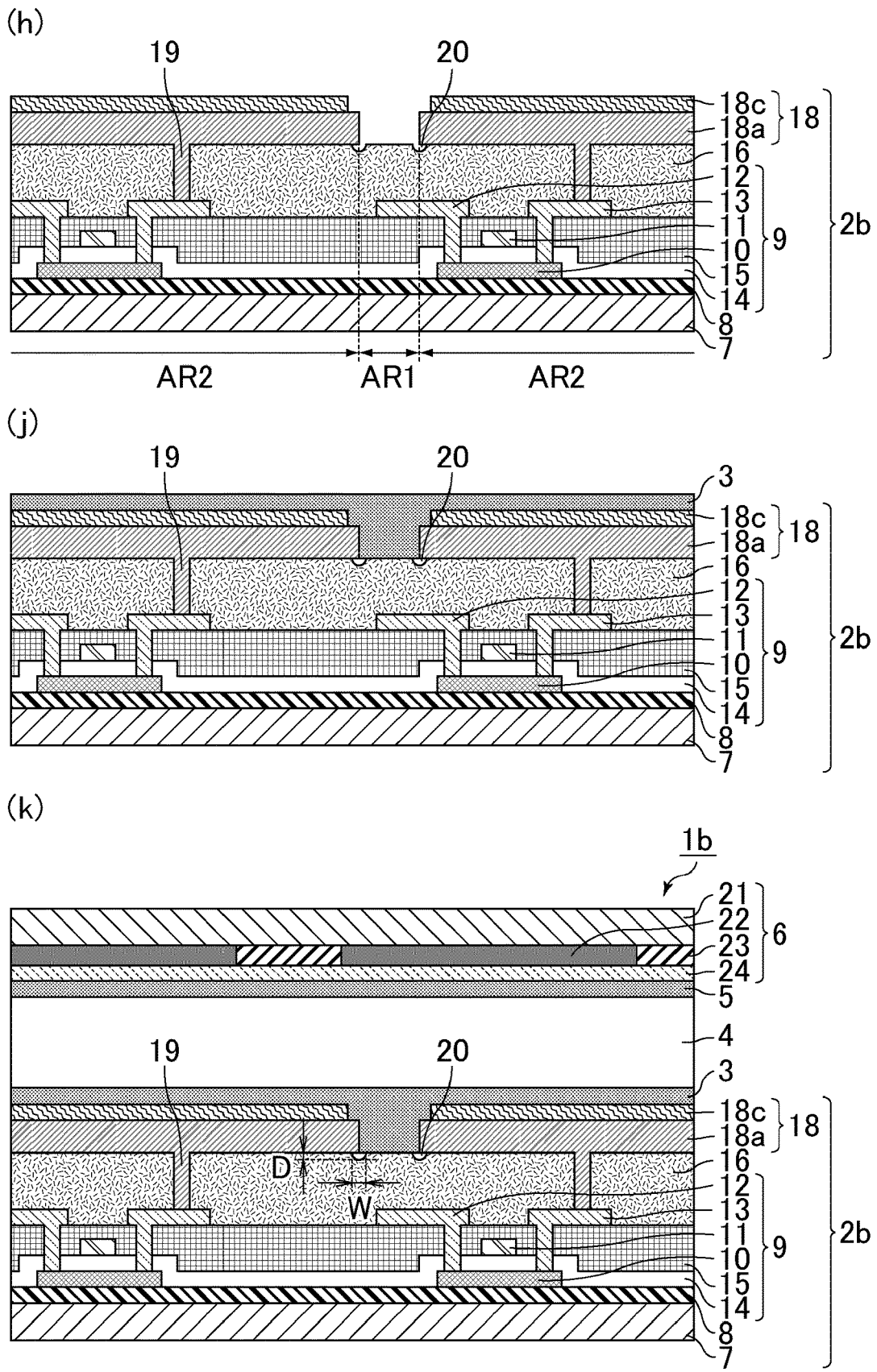

When the liquid crystal display panel 1b is used as a memory liquid crystal display panel, for example, the first substrate 2b is provided with a memory circuit such as a static random access memory (SRAM).
(2) Method for Producing a Liquid Crystal Display Panel A method for producing the liquid crystal display panel of Embodiment 2 is described hereinbelow with reference to FIGS. 7-1 to 7-3. FIG. 7-1 includes schematic cross-sectional views illustrating a method for producing the liquid crystal display panel of Embodiment 2 (steps a, b, c, and d). FIG. 7-2 includes schematic cross-sectional views illustrating the method for producing the liquid crystal display panel of Embodiment 2 (steps e, f, and g). FIG. 7-3 includes schematic cross-sectional views illustrating the method for producing the liquid crystal display panel of Embodiment 2 (steps h, j, and k). The method for producing the liquid crystal display panel of Embodiment 2 is the same as the method for producing the liquid crystal display panel of Embodiment 1, except that a reflective electrode is formed as the second electrode instead of the transparent electrode. Thus, the descriptions of the same features as in Embodiment 1 are omitted as appropriate.
(a) Formation of Thin-Film Transistor Elements and Organic Insulating Film As illustrated in FIG. 7-1(a), the base coat layer 8 and the thin-film transistor elements 9 (thin-film transistor elements each including the semiconductor layer 10, the gate electrode 11, the source electrode 12, the drain electrode 13, the gate insulating film 14, and the interlayer insulating film 15) are formed on the viewing side surface of the first support 7 by a conventionally known method. The organic insulating film 16 is then formed so as to cover the source electrodes 12 and the drain electrodes 13. In this step, the organic insulating film 16 is provided with the contact holes 19 by photolithography so as to expose part of each drain electrode 13.
(b) Formation of First Electrode As illustrated in FIG. 7-1(b), the first electrode 18a (transparent electrode) is formed on the viewing side surface of the organic insulating film 16. As a result, the first electrode 18a is electrically connected with the drain electrodes 13 via the contact holes 19. In this step, the thickness of the first electrode 18a is identical with the thickness (designed value) of the final target transparent electrode.
(c) Formation of Photoresist As illustrated in FIG. 7-1(c), the photoresist 27 is partially formed on the viewing side surface of the first electrode 18a. As a result, the first electrode 18a is partially exposed through the photoresist 27.
(d) Division of First Electrode The exposed parts of the first electrode 18a are removed by etching, and then the photoresist 27 is removed. Thereby, as illustrated in FIG. 7-1(d), the first electrode 18a is divided into parts for the respective pixels. This provides the first area AR1 where the viewing side surface of the organic insulating film 16 is exposed through the first electrode 18a and the second area AR2 where the viewing side surface of the organic insulating film 16 is not exposed through the first electrode 18a (is covered with the first electrode 18a).
(e) Formation of Second Electrode As illustrated in FIG. 7-2(e), the second electrode 18c (reflective electrode) is formed on the viewing side (the entire surface) of the first area AR1 and the second area AR2. In this step, in the first area AR1, the organic insulating film 16 is the base. Thus, the second electrode 18c less spreads in the lateral direction and does not closely adhere to the first electrode 18a that has already been formed, so that gaps 28 are formed between each first electrode 18a and the second electrode 18c.

The second electrode 18c may be either a monolayer of a single electrode or a stack of multiple electrode species.

The second electrode 18c may be formed by chemical vapor deposition (CVD) or sputtering, for example.
(f) Formation of Voids As illustrated in FIG. 7-2(f), the first area AR1 and the second area AR2 are subjected to a plasma treatment from the second electrode 18c side. Plasma enters the organic insulating film 16 through the gaps 28 and the voids 20 are resultantly formed at the boundaries of the first area AR1 and the second area AR2 in the organic insulating film 16.
(g) Formation of Photoresist As illustrated in FIG. 7-2(g), the photoresist 27 is partially formed on the viewing side surface of the second electrode 18c in the second area AR2. As a result, the second electrode 18c in the first area AR1 is exposed through the photoresist 27. Also, the second electrode 18c in the second area AR2 is partially exposed through the photoresist 27.

(h) Formation of Pixel Electrodes

The second electrodes 18c in the first area AR1 and the exposed second electrode 18c in the second area AR2 are removed by etching, and then the photoresist 27 is removed. Thereby, as illustrated in FIG. 7-3(h), the pixel electrodes 18 each of which is a stack of the first electrode 18a and the second electrode 18c is formed in the second area AR2. Consequently, the first substrate 2b is completed.

In the second area AR2, the second electrode 18c (reflective electrode) formed is preferably smaller than the first electrode 18a (transparent electrode) (the ends of the second electrode 18c are preferably inside the ends of the first electrode 18a), as illustrated in FIG. 7-3(h). If the second electrode 18c is larger than the first electrode 18a due to variation in formation of the first electrode 18a that is a transparent electrode and the second electrode 18c that is a reflective electrode, the second electrode 18c may partially be present in the voids 20.

The technique of etching the second electrode 18c may be wet etching or dry etching, for example, and may be selected as appropriate in accordance with the material of the second electrode 18c.

On the viewing side surface of the second electrode 18c may be formed another transparent electrode that controls an electric field applied to the liquid crystal layer 4.

(j) Formation of First Alignment Film

As illustrated in FIG. 7-3(j), the first alignment film 3 is formed on the viewing side surface of the first substrate 2b. Specifically, first, a first alignment material is applied to the viewing side surface of the first substrate 2b. The first alignment material is then dried and baked, so that the first alignment film 3 is formed.

(k) Completion of Liquid Crystal Display Panel

A material of the liquid crystal layer 4 is dropped on a surface of at least one of the first Substrate 2b or the second substrate 6, and the first substrate 2b and the second substrate 6 are attached to each other. As a result, the liquid crystal display panel 1b as illustrated in FIG. 7-3(k) is completed. In the liquid crystal display panel 1b, the voids 20 are each placed at a position overlapping an end of the pixel electrode 18. The organic insulating film 16 is in contact with each pixel electrode 18 (first electrode 18a).

The production method of the present embodiment can provide the voids 20 each at a position overlapping an end of the pixel electrode 18 in the organic insulating film 16. This clarifies that the production method of the present embodiment can also provide the same effects as the production method of Embodiment 1.

Described in the production method of the present embodiment is the case where the first electrode 18a is a transparent electrode and the second electrode 18c is a reflective electrode. Alternatively, the first electrode 18a may be a reflective electrode and the second electrode 18c may be a transparent electrode, for example.

ADDITIONAL REMARKS

An aspect of the present invention may be a liquid crystal display panel including, sequentially from a back side to a viewing side: a first substrate; a liquid crystal layer; and a second substrate, the first substrate including, sequentially from a liquid crystal layer side, a pixel electrode and an organic insulating film in contact with the pixel electrode, the organic insulating film being provided with a void at a position overlapping an end of the pixel electrode. This aspect enables a liquid crystal display panel capable of reducing display defects due to bubbles.

In an aspect of the present invention, the second substrate may include a black matrix, and the void may overlap the black matrix. This structure can shade a region including the void with the black matrix in a plan view of the liquid crystal display panel, minimizing the influence on the display quality.

In an aspect of the present invention, the liquid crystal display panel may further include a first alignment film on a viewing side surface of the first substrate, and the void may be sealed by the first alignment film. This structure can hermetically seal the void and enables efficient accumulation of the gas generated from the organic insulating film.

In an aspect of the present invention, the void may have a width of 0.1 to 1 μm. This structure can ensure a sufficient capacity of the void and enables efficient accumulation of the gas generated from the organic insulating film. This structure can also sufficiently prevent display defects due to breakage of the pixel electrode.

In an aspect of the present invention, the void may have a depth of 0.1 to 1 μm. This structure can ensure a sufficient capacity of the void and enables efficient accumulation of the gas generated from the organic insulating film. This structure can also sufficiently prevent display defects due to a change in potential at an end of the pixel electrode.

Another aspect of the present invention may be a method for producing a liquid crystal display panel that includes, sequentially from a back side to a viewing side, a first substrate, a liquid crystal layer, and a second substrate, the method sequentially including: a process (1) of sequentially stacking an organic insulating film and a first electrode on a viewing side of a first support to form a first area where a viewing side surface of the organic insulating film is exposed through the first electrode and a second area where the viewing side surface of the organic insulating film is not exposed through the first electrode; a process (2) of forming a second electrode on a viewing side of each of the first area and the second area; a process (3) of performing a plasma treatment on the first area and the second area from a second electrode side to form a void at a boundary between the first area and the second area in the organic insulating film; a process (4) of removing the second electrode in the first area to form the first substrate that includes a pixel electrode including the first electrode and the second electrode in the second area; and a process (5) of placing the liquid crystal layer between the first substrate and the second substrate, the organic insulating film being in contact with the pixel electrode, the void being placed at a position overlapping an end of the pixel electrode in the organic insulating film. This aspect enables production of a liquid crystal display panel capable of reducing display defects due to bubbles.

In another aspect of the present invention, the plasma treatment in the process (3) may be performed using $CF_4$ gas. This enables efficient formation of the void.

In another aspect of the present invention, the method for producing a liquid crystal display panel may further include, before the process (5), a process (6) of placing a black matrix on a back side of a second support to form the second substrate. This enables the use of a shading function by the black matrix in the liquid crystal display panel.

In another aspect of the present invention, the void may overlap the black matrix. This structure can shade a region including the void with the black matrix in a plan view of the liquid crystal; display panel, minimizing the influence on the display quality.

In another aspect of the present invention, the method for producing a liquid crystal display panel may further include, between the process (4) and the process (5), a process (7) of applying a first alignment material to a viewing side surface of the first substrate, and then drying and baking the first alignment material to form a first alignment film. This enables the use of an alignment control function by the first alignment film in the liquid crystal display panel.

In another aspect of the present invention, in the process (7), a vacuum degassing treatment may be performed to discharge air in the void before drying the first alignment material. This can make the void in a vacuum state and enables more efficient accumulation of the gas generated from the organic insulating film.

In another aspect of the present invention, the void may be sealed by the first alignment film. This structure can hermetically seal the void and enables efficient accumulation of the gas generated from the organic insulating film.

In another aspect of the present invention, the void may have a width of 0.1 to 1 µm. This structure can ensure a sufficient capacity of the void and enables efficient accumulation of the gas generated from the organic insulating film. This structure can also sufficiently prevent display defects due to breakage of the pixel electrode.

In another aspect of the present invention, the void may have a depth of 0.1 to 1 µm. This structure can ensure a sufficient capacity of the void and enables efficient accumulation of the gas generated from the organic insulating film. This structure can also sufficiently prevent display defects due to a change in potential at an end of the pixel electrode.

REFERENCE SIGNS LIST 1a, 1b, 101: liquid crystal display panel
2a, 2b, 102: first substrate
3, 103: first alignment film
4, 104: liquid crystal layer
5, 105: second alignment film
6, 106: second substrate
7, 107: first support
8, 108: base coat layer
9, 109: thin-film transistor element
10, 110: semiconductor layer
11, 111: gate electrode
12, 112: source electrode
13, 113: drain electrode
14, 114: gate insulating film
15, 115: interlayer insulating film
16, 116: organic insulating film
117: gas barrier layer
18, 118: pixel electrode
18a: first electrode
18b, 18c: second electrode
19, 119: contact hole
20: void
21: second support
22: black matrix
23: color filter layer
24: common electrode
25: gate bus line
26: source bus line
27: photoresist
28: gap
W: width of void
D: depth of void
AR1: first area
AR2: second area

The invention claimed is:

1. A liquid crystal display panel comprising, sequentially from a back side to a viewing side:
a first substrate;
a liquid crystal layer; and
a second substrate,
the first substrate including, sequentially from a liquid crystal layer side, a pixel electrode and an organic insulating film in contact with the pixel electrode,
the organic insulating film being provided with a void at a position overlapping an end of the pixel electrode.

2. The liquid crystal display panel according to claim 1, wherein the second substrate includes a black matrix, and the void overlaps the black matrix.

3. The liquid crystal display panel according to claim 1, further comprising a first alignment film on a viewing side surface of the first substrate,
wherein the void is sealed by the first alignment film.

4. The liquid crystal display panel according to claim 1, wherein the void has a width of 0.1 to 1 µm.

5. The liquid crystal display panel according to claim 1, wherein the void has a depth of 0.1 to 1 µm.

6. A method for producing a liquid crystal display panel that includes, sequentially from a back side to a viewing side, a first substrate, a liquid crystal layer, and a second substrate, the method sequentially comprising:
a process (1) of sequentially stacking an organic insulating film and a first electrode on a viewing side of a first support to form a first area where a viewing side surface of the organic insulating film is exposed through the first electrode and a second area where the viewing side surface of the organic insulating film is not exposed through the first electrode;
a process (2) of forming a second electrode on a viewing side of each of the first area and the second area;
a process (3) of performing a plasma treatment on the first area and the second area from a second electrode side to form a void at a boundary between the first area and the second area in the organic insulating film;
a process (4) of removing the second electrode in the first area to form the first substrate that includes a pixel electrode including the first electrode and the second electrode in the second area; and
a process (5) of placing the liquid crystal layer between the first substrate and the second substrate,
the organic insulating film being in contact with the pixel electrode,
the void being placed at a position overlapping an end of the pixel electrode in the organic insulating film.

7. The method for producing a liquid crystal display panel according to claim 6,
wherein the plasma treatment in the process (3) is performed using $CF_4$ gas.

8. The method for producing a liquid crystal display panel according to claim 6, further comprising, before the process (5), a process (6) of placing a black matrix on a back side of a second support to form the second substrate.

9. The method for producing a liquid crystal display panel according to claim 8,
wherein the void overlaps the black matrix.

10. The method for producing a liquid crystal display panel according to claim 6, further comprising, between the process (4) and the process (5), a process (7) of applying a first alignment material to a viewing side surface of the first substrate, and then drying and baking the first alignment material to form a first alignment film.

11. The method for producing a liquid crystal display panel according to claim 10,
wherein in the process (7), a vacuum degassing treatment is performed to discharge air in the void before drying the first alignment material.

12. The method for producing a liquid crystal display panel according to claim 10,
wherein the void is sealed by the first alignment film.

13. The method for producing a liquid crystal display panel according to claim 6,
wherein the void has a width of 0.1 to 1 µm.

14. The method for producing a liquid crystal display panel according to claim 6,
wherein the void has a depth of 0.1 to 1 µm.

* * * * *